United States Patent
Tatsukami et al.

(10) Patent No.: US 9,870,032 B2
(45) Date of Patent: Jan. 16, 2018

(54) ELECTRONIC DEVICE AND HINGE UNIT

(71) Applicant: FUJITSU LIMITED, Kawasaki-shi, Kanagawa (JP)

(72) Inventors: Ikki Tatsukami, Tama (JP); Takashi Abe, Kawasaki (JP); Shingo Awaji, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 59 days.

(21) Appl. No.: 15/070,628

(22) Filed: Mar. 15, 2016

(65) Prior Publication Data

US 2016/0195903 A1    Jul. 7, 2016

Related U.S. Application Data

(63) Continuation of application No. PCT/JP2013/076439, filed on Sep. 27, 2013.

(51) Int. Cl.
  *G06F 1/16* (2006.01)
  *E05D 3/10* (2006.01)

(52) U.S. Cl.
  CPC ............ *G06F 1/1681* (2013.01); *G06F 1/162* (2013.01); *E05D 3/10* (2013.01)

(58) Field of Classification Search
  CPC .......... G06F 1/1681; G06F 1/162; E05D 3/10
  USPC .................................... 361/679.27
  See application file for complete search history.

(56) References Cited

U.S. PATENT DOCUMENTS

| 2004/0075971 A1* | 4/2004 | Tseng ...................... G06F 1/162 361/679.06 |
| 2005/0066477 A1* | 3/2005 | Yang ..................... G06F 1/1679 16/374 |
| 2006/0198093 A1* | 9/2006 | Chuang .................... E05D 3/10 361/679.09 |

(Continued)

FOREIGN PATENT DOCUMENTS

| JP | 1993-119867 | 5/1993 |
| JP | 2004-23469 | 1/2004 |

(Continued)

OTHER PUBLICATIONS

JPOA—Office Action of Japanese Patent Application No. 2015-538765 dated Sep. 20, 2016, with English translation of the relevant part. Remaining references cited in the JPOA were previously submitted in the IDS filed on Mar. 15, 2016.

(Continued)

*Primary Examiner* — Anthony Haughton
*Assistant Examiner* — Yahya Ahmad
(74) *Attorney, Agent, or Firm* — Fujitsu Patent Center

(57) ABSTRACT

The electrical device includes a coupling member, a supporting member, a rotation section, a moving member, and a biasing member. The coupling member is provided at a first casing, and is formed with the rotation shaft. The supporting member is provided at a second casing, and is formed with a shaft hole into which the rotation shaft is inserted. The rotation section is provided at the rotation shaft, and is formed with a recessed portion open toward the outside in the radial direction of the rotation shaft. The moving member includes a protruding portion to engage with the recessed portion, and moves in the radial direction (Continued)

at the outside of the shaft hole. The biasing member biases the moving member toward the rotation center of the rotation shaft.

16 Claims, 14 Drawing Sheets

(56) References Cited

U.S. PATENT DOCUMENTS

| | | | | |
|---|---|---|---|---|
| 2010/0170063 | A1* | 7/2010 | Hung | G06F 1/162 16/343 |
| 2015/0061479 | A1* | 3/2015 | Yamamoto | G06F 1/1681 312/305 |
| 2015/0062808 | A1* | 3/2015 | Abe | G06F 1/1643 361/679.55 |
| 2016/0027597 | A1* | 1/2016 | Abe | H01H 13/7065 200/5 A |
| 2016/0195903 | A1* | 7/2016 | Tatsukami | G06F 1/1681 361/679.27 |
| 2016/0208530 | A1* | 7/2016 | Tatsukami | E05D 3/10 |

FOREIGN PATENT DOCUMENTS

| | | |
|---|---|---|
| JP | 2005-009602 | 1/2005 |
| JP | 2005-121068 | 5/2005 |
| JP | 2006-336802 | 12/2006 |
| JP | 2008-291961 | 12/2008 |
| JP | 2011-112150 | 6/2011 |

OTHER PUBLICATIONS

International Search Report and Written Opinion of the International Searching Authority (Form PCT/ISA/210, Form PCT/ISA/237), mailed in connection with PCT/JP2013/076439 and dated Dec. 3, 2013 (11 pages).

* cited by examiner

US 9,870,032 B2

ELECTRONIC DEVICE AND HINGE UNIT

CROSS-REFERENCE TO RELATED APPLICATION

This application is a continuation application of International Application No. PCT/JP2013/076439 filed on Sep. 27, 2013 and designated the U.S., the entire contents of which are incorporated herein by reference.

FIELD

The present disclosure relates to an electronic device and a hinge unit.

BACKGROUND

Conventional hinge units are known in which a recessed portion is formed in an outer periphery of a rotation shaft that rotates together with a first member or a second member, and the recessed portion engages with a protruding member that is biased by a biasing member to retain the first member or the second member in a predetermined rotation position. For example, see Japanese Patent Application Laid-Open (JP-A) No. 2004-23469.

SUMMARY

In such hinge units, in cases in which the biasing direction by the biasing member is not controlled, there is a concern that the direction of force acting on the rotation shaft changes when the rotation shaft has rotated.

The present disclosure provides an electronic device and a hinge unit capable of suppressing a change in direction of force acting on a rotation shaft in a case in which the rotation shaft has rotated.

The present disclosure provides an electronic device including a coupling member, a supporting member, a rotation section, a moving member, and a biasing member. The coupling member is provided at a first casing, and is formed with a rotation shaft. The supporting member is provided at a second casing, and is formed with a shaft hole into which the rotation shaft is inserted. The rotation section is provided at the rotation shaft, and is formed with a recessed portion open toward the outside in the radial direction of the rotation shaft. The moving member includes a protruding portion to engage with the recessed portion, and moves in the radial direction at the radial direction outside of the shaft hole. The biasing member biases the moving member toward the rotation center of the rotation shaft.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Explanation follows regarding an exemplary embodiment of the present disclosure.

Figure 1:
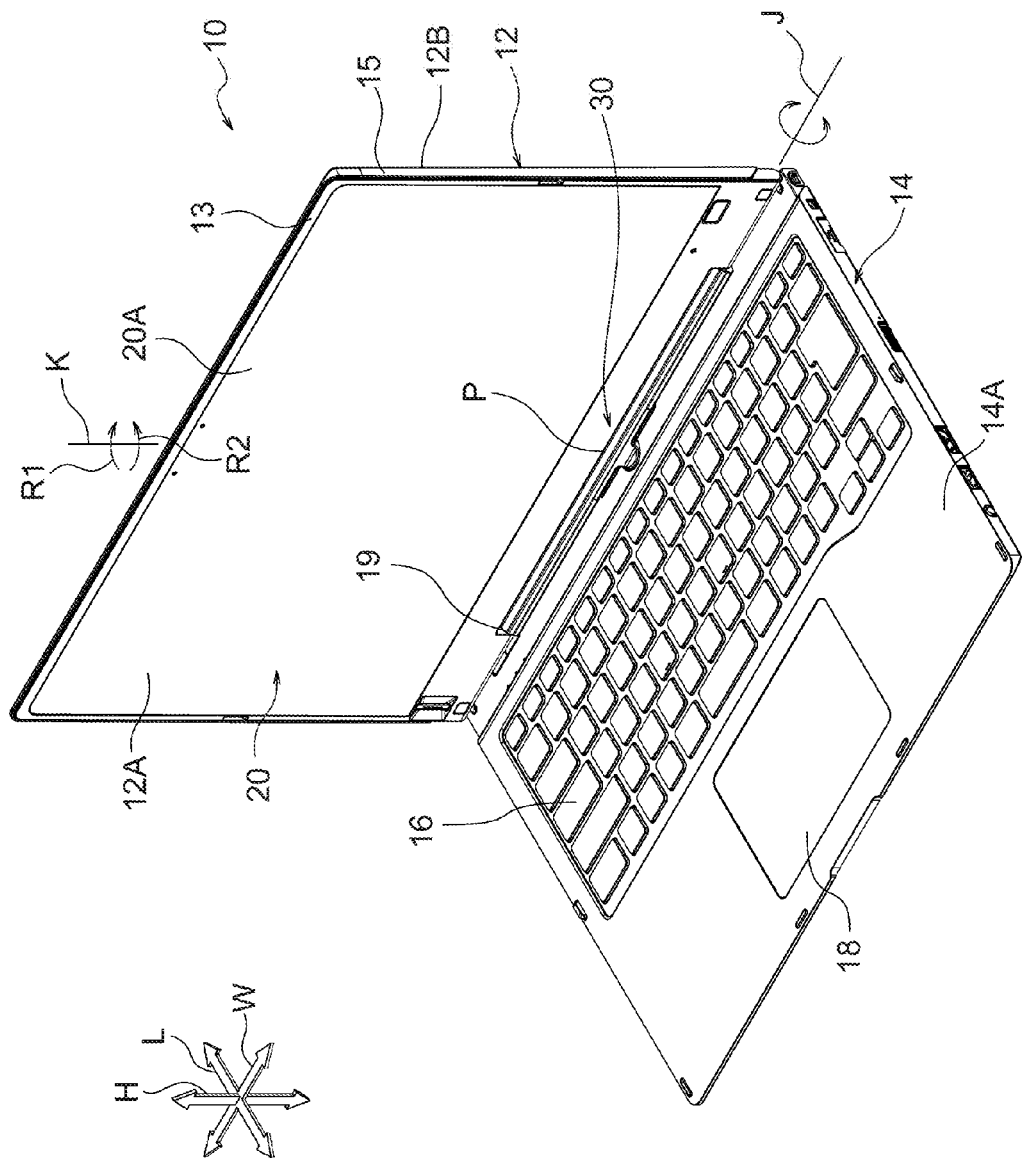
FIG. 1 is a perspective view illustrating an open state of a personal computer of an exemplary embodiment.

FIG. 1 illustrates a notebook personal computer 10, serving as an example of an electronic device.

The personal computer 10 includes a display casing 12 serving as an example of a first casing, a main body casing 14 serving as an example of a second casing, and a coupling section 30 that couples the display casing 12 and the main body casing 14 together. Note that in each of the drawings, the arrow W indicates the width direction, the arrow L indicates the length direction, and the arrow H indicates the height direction (vertical direction) of the personal computer 10. The W direction, the L direction, and the H direction are orthogonal to each other. Placement of the respective members of the personal computer 10 is described with reference to the right side, left side, front side, rear side, upper side, and lower side, when a display panel 20, described later, is viewed face-on.

As illustrated in FIG. 1, an axial line forming a pivot center when the display casing 12 is tilted toward the main body casing 14 configures a first axial line J, and an axial line forming a rotation center when the display casing 12 is rotated with respect to the main body casing 14 configures a second axial line K. The first axial line J is a straight line along the W direction, and the second axial line K is a straight line along the H direction. A position that is at the center of the display casing 12 in the W direction and that is also a position on the first axial line J configures a center position P. As an example, the second axial line K is positioned offset from the center position P toward the L direction front side.

Main Body Casing

As illustrated in FIG. 1, the main body casing 14 is formed in a rectangular shape with its length direction along the W direction in plan view, and is made of metal (a magnesium alloy, for example). A motherboard 25 (see FIG. 2), a battery, a fan, a hard disk (not illustrated in the drawings), and the like are assembled inside the main body casing 14.

Figure 2:
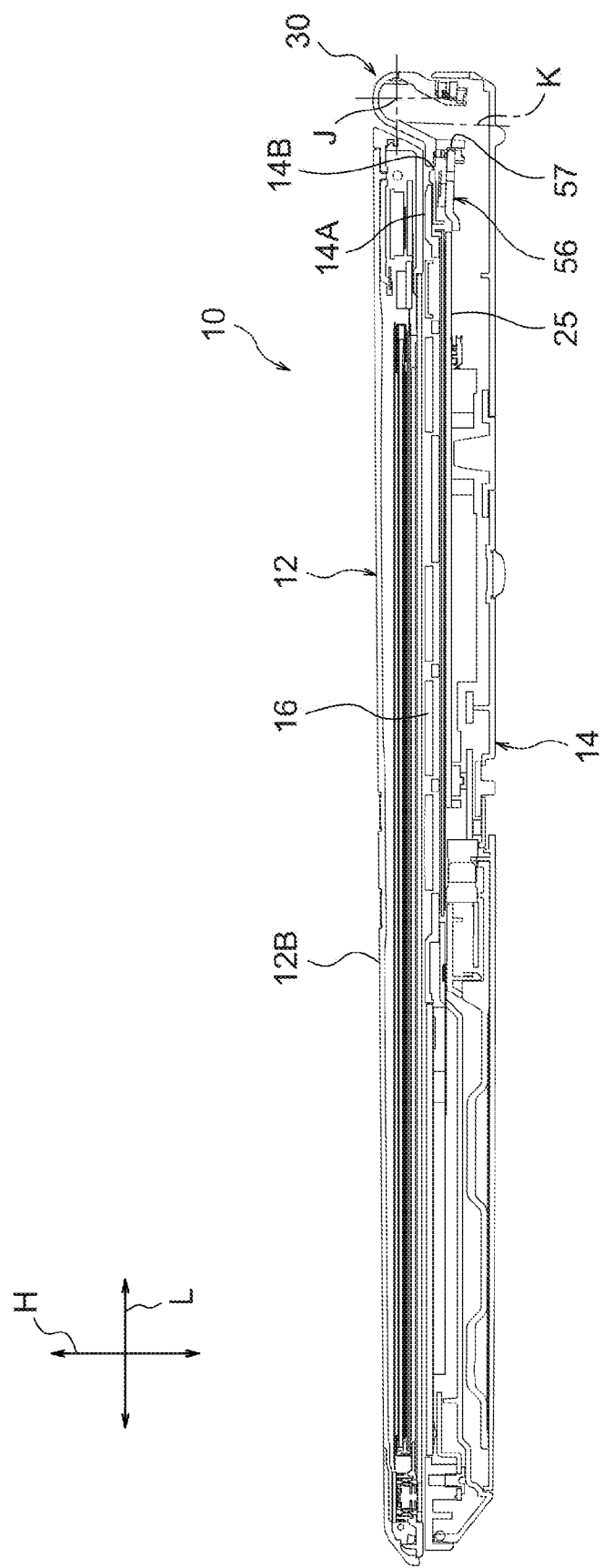
FIG. 2 is a vertical cross-section of a personal computer.

Elements of an electronic circuit, such as a central processing unit (CPU) and memory (not illustrated in the drawings) are, for example, mounted on the motherboard 25 (see FIG. 2). The CPU executes various computation processing based on a software program or data that is temporarily stored in the memory. The software program or data is stored on a hard disk (not illustrated in the drawings).

The main body casing 14 includes an upper plate 14A covering the H direction upper side. A keyboard 16 and a touch pad 18, these being input devices serving as an example of an input section where information or a command is input, are disposed on the upper plate 14A. Plural keypads are arrayed on the keyboard 16. In the personal computer 10, a user operates the keyboard 16 or the touch pad 18 to input various commands or data to the abovementioned CPU. A through-hole 14B (see FIG. 2) is formed piercing through in the H direction at the W direction center and L direction rear side of the upper plate 14A.

Display Casing

As illustrated in FIG. 1, the display panel 20, this being a liquid crystal display panel serving as an example of a display section that displays information processing results (images, videos, or the like) executed by the CPU, is incorporated in the display casing 12. The display casing 12 includes a frame shaped front cover 13 that covers an outer peripheral portion of the display panel 20 from the front side, and a back cover 15 that covers the display panel 20 from the rear side. A front face of the display panel 20 configures a display face 20A that displays images, videos, and so on, and is exposed through the inside of the front cover 13.

Various text and graphics are displayed on the display face 20A based on the computation processing by the abovementioned CPU. A touch panel input device is disposed on the display panel 20. For example, various commands and data are input from the touch panel to the CPU by a stylus operation or the fingers of the user.

In a face-on view of the display panel 20, a cutout portion 19 that is cut out in a flattened, inverted U-shape is formed in a lower end portion of the display casing 12. A coupling member 52 (see FIG. 8), described later, is disposed in the cutout portion 19. Namely, the coupling member 52 is provided at the display casing 12.

Note that a state in which the display casing 12 is open at an angle of 90° with respect to the main body casing 14 is referred to as an open state. Note that in the present exemplary embodiment, tilting of the display casing 12 about the first axial line J is referred to as pivoting, and turning of the display casing 12 about the second axial line K is referred to as rotating.

In the display casing 12, a face at the side where the display panel 20 is provided is referred to as a back face 12A, and a face at the opposite side to the display panel 20 is referred to as a front face 12B. The back face 12A and the front face 12B are switched by rotating the display casing 12 by 180° in the arrow R1 direction or the arrow R2 direction about the second axial line K. In plan view of the display casing 12 in a state in which the main body casing 14 is disposed at the front side thereof, the arrow R1 direction is the clockwise direction, and the arrow R2 direction is the counterclockwise direction.

Coupling Section

Figure 3:
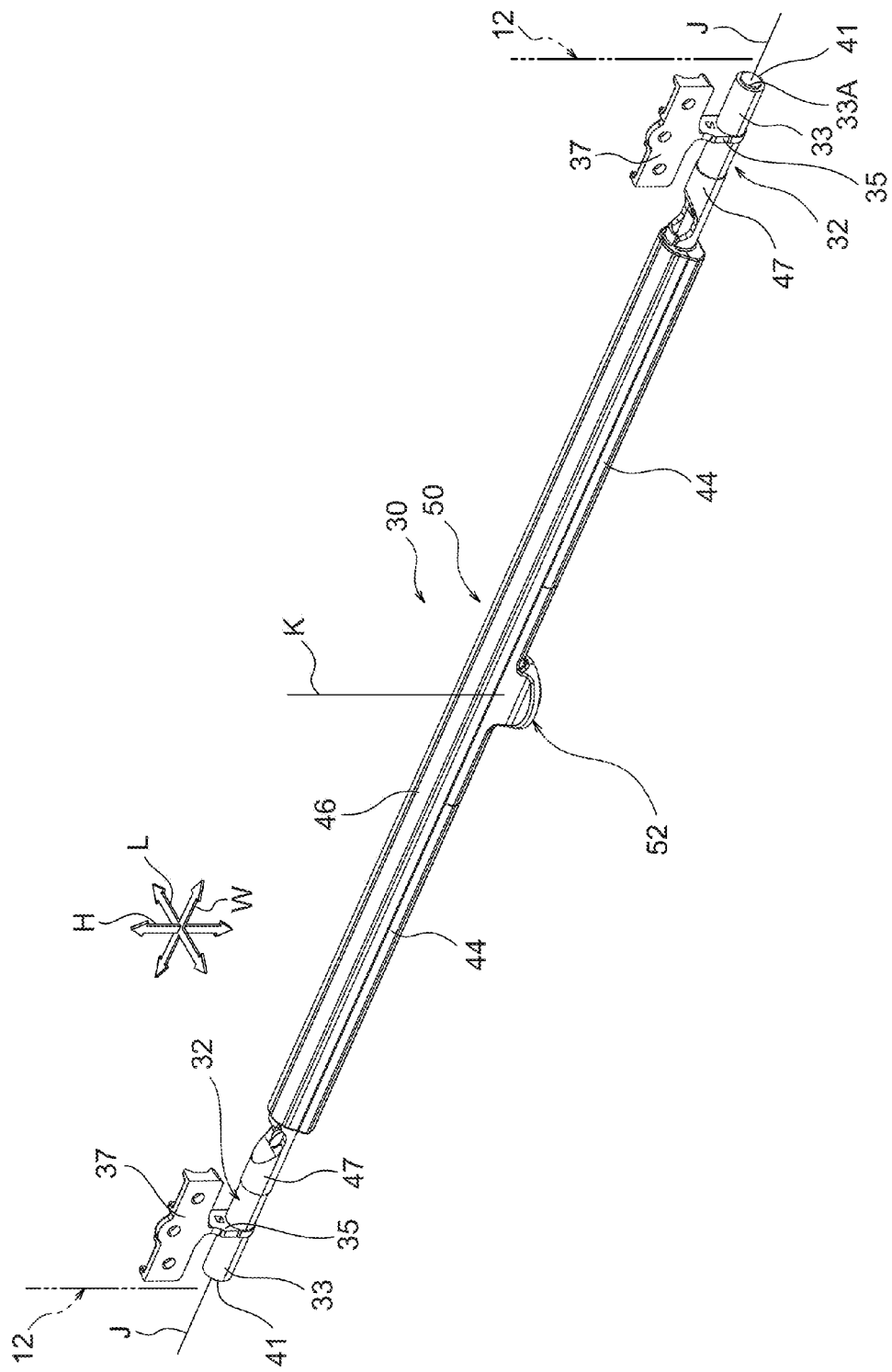
FIG. 3 is a perspective view of a hinge unit.
Figure 4:
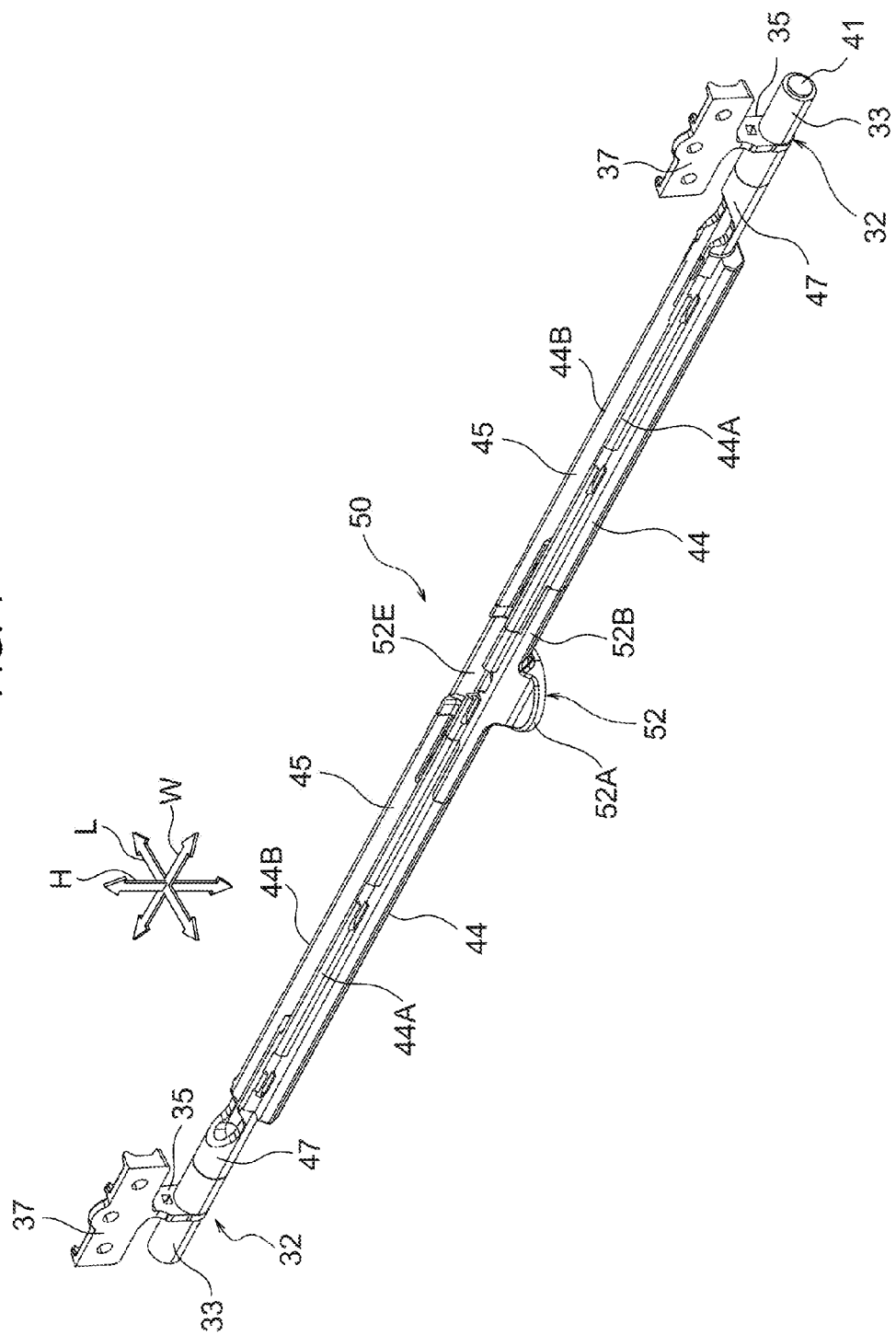
FIG. 4 is a perspective view illustrating a hinge unit in a state in which a cover member of the hinge unit has been removed.

As illustrated in FIG. 3 and FIG. 4, the coupling section 30 includes, as an example, two pivot sections 32 that pivot about the first axial line J, and a hinge unit 50 that supports the two pivot sections 32. The hinge unit 50 rotates the display casing 12 (see FIG. 1) about the second axial line K.

Pivot Sections

Each pivot section 32 includes a cylinder portion 33 that combines plural springs, a projecting portion 35 projecting out toward the outside of the cylinder portion 33, and a plate shaped attachment portion 37 that is formed at an end portion of the projecting portion 35. The attachment portion 37 runs along the W-H plane of the display casing 12 in the open state. Note that the pivot sections 32 are disposed at either W direction side of arm members 44, described later.

A through-hole 33A is formed piercing through each cylinder portion 33 in the W direction. A shaft 41, which is attached to the respective arm member 44, is inserted into the through-hole 33A, and a retaining member such as a C ring (not illustrated in the drawings) is provided, such that the cylinder portion 33 pivots with the first axial line J as its pivot center.

The attachment portions 37 are, as an example, fastened by screws (not illustrated in the drawings) to bosses (not illustrated in the drawings) protruding straight out from an inner wall face of the back cover 15 (see FIG. 1) of the display casing 12. Namely, the pivot sections 32 are provided at the display casing 12. Thus, as illustrated in FIG. 2, the display casing 12 pivots (tilts) about the first axial line J with respect to the main body casing 14.

Hinge Unit

Explanation follows regarding the hinge unit 50.

Figure 5:
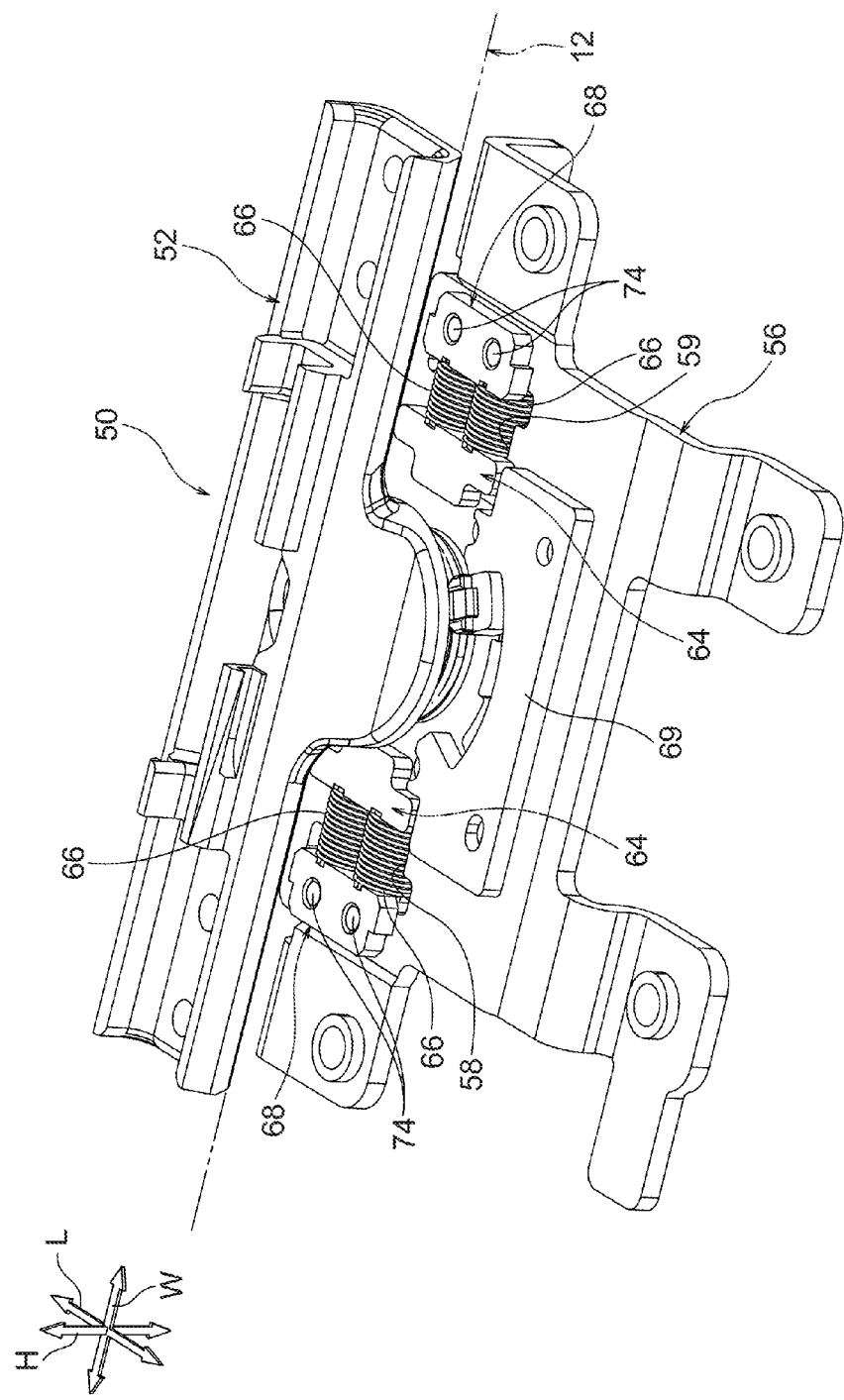
FIG. 5 is an enlarged perspective view of part of a hinge unit.
Figure 6:
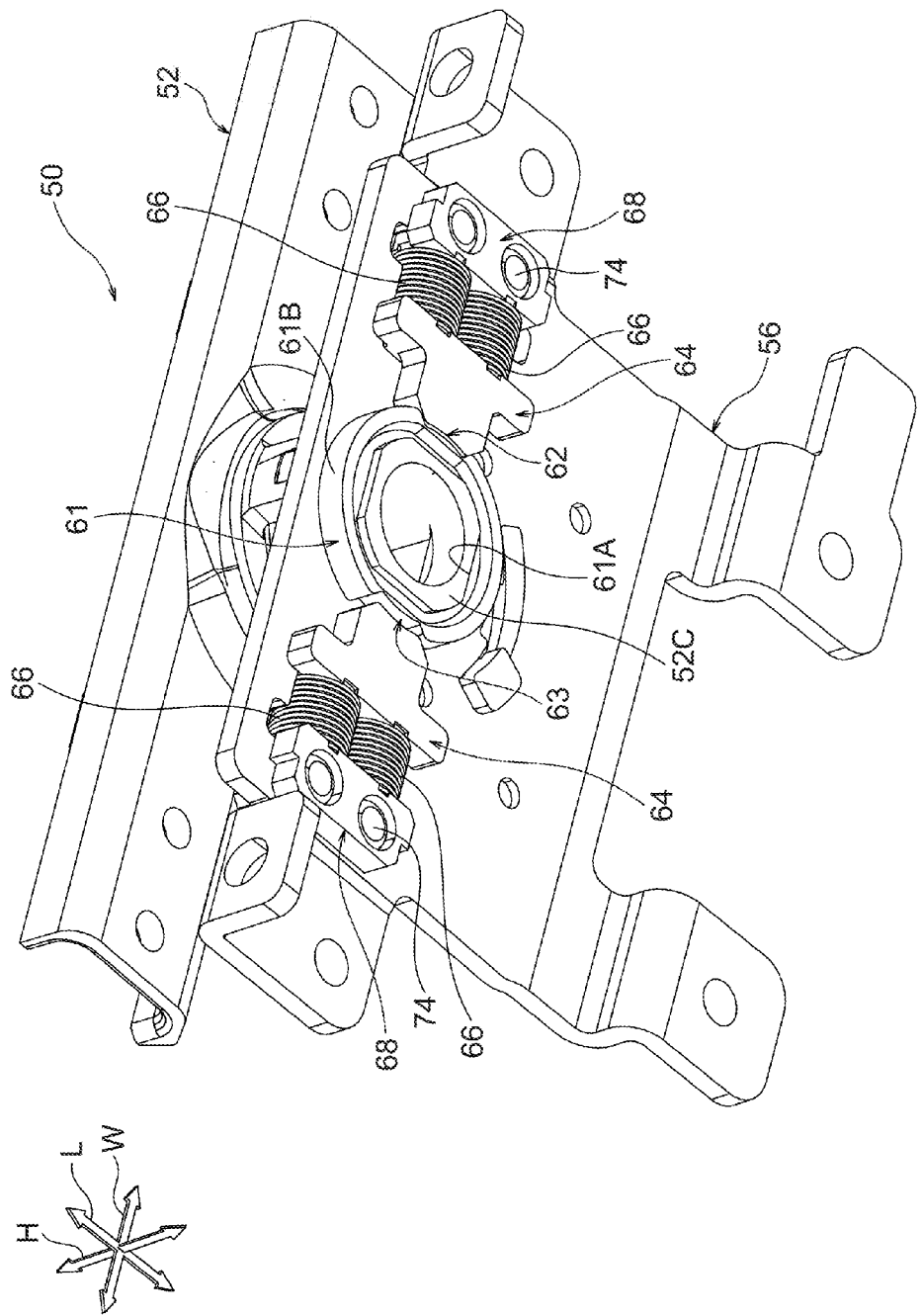
FIG. 6 is an enlarged perspective view of part of a hinge unit.

As illustrated in FIG. 5, the hinge unit 50 includes the coupling member 52 that couples the display casing 12 and the main body casing 14 together (see FIG. 1), and a base 56, serving as an example of a supporting member that supports the coupling member 52. As illustrated in FIG. 6, the hinge unit 50 also includes a washer 61 serving as an example of a rotation section, two cam members 64 serving as an example of moving members, and four springs 66 serving as an example of biasing members and of spring members. The hinge unit 50 also includes two block members 68 serving as an example of retaining members.

Coupling Member

Figure 8:
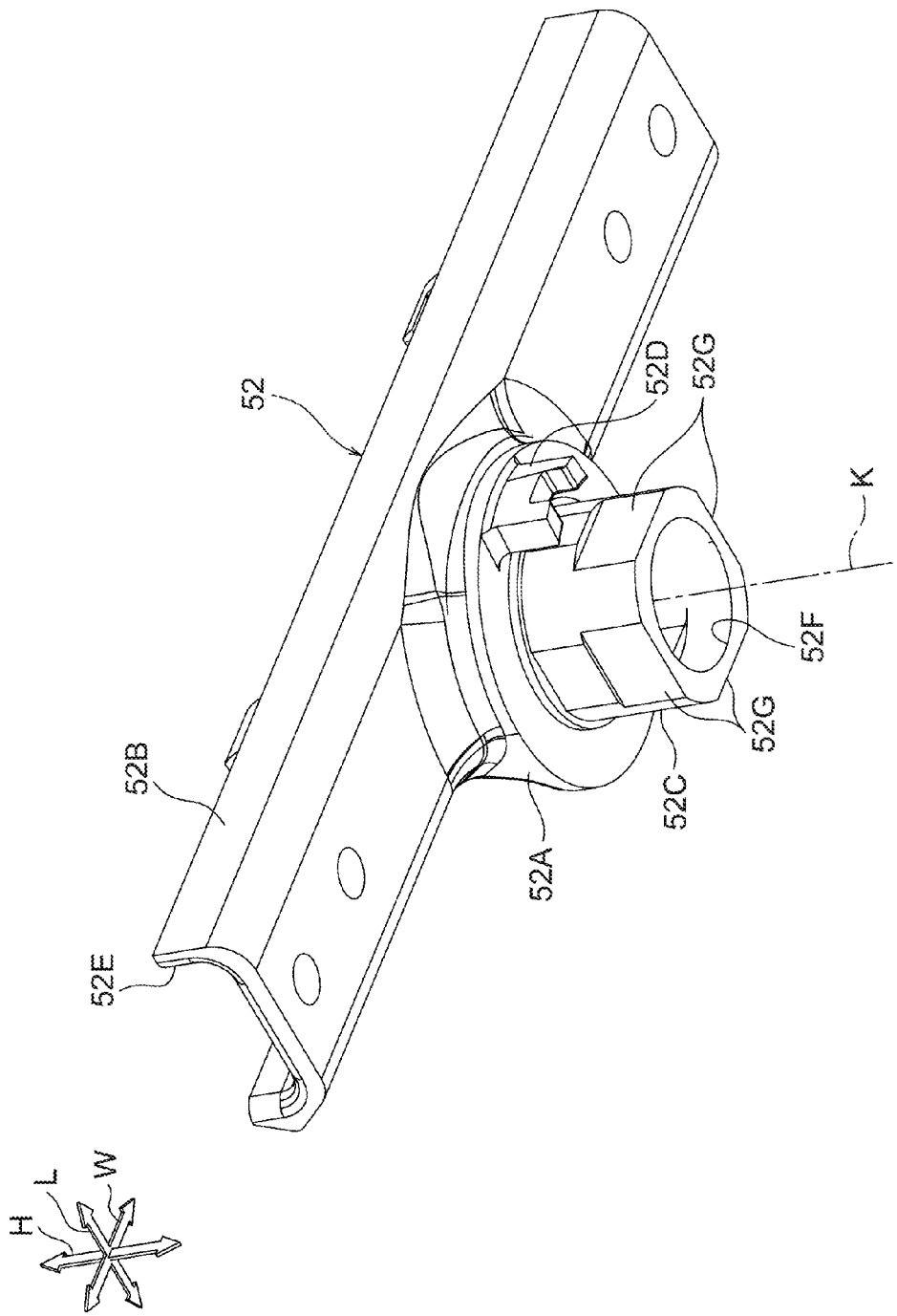
FIG. 8 is a perspective view of a coupling member.

As illustrated in FIG. 8, the coupling member 52 includes a circular ring shaped main body portion 52A, and an extension portion 52B extending from an H direction upper portion of the main body portion 52A toward either W direction side.

A center position of the main body portion 52A is disposed on the second axial line K. The main body portion 52A is formed with a shaft portion 52C, serving as an example of a rotation shaft extending from an H direction lower portion thereof toward the lower side. The main body portion 52A is also formed with a contact portion 52D that is indirectly restricted from rotating by a restricting plate 69 (see FIG. 5), described later.

The extension portion 52B is formed with a groove 52E with a U-shaped L-H plane cross-section. Various wiring (not illustrated in the drawings), such as signal wires and power supply wires, is housed inside the groove 52E. As an example, the arm members 44 (see FIG. 3) that support the display casing 12 (see FIG. 3) with their length direction along the W direction are attached to respective W direction end portions of the extension portion 52B.

The shaft portion 52C is inserted into a shaft hole 57 (see FIG. 9) of the base 56 (see FIG. 9), described later, and rotates about the second axial line K. The shaft portion 52C is formed with a through-hole 52F. The through-hole 52F pierces through the shaft portion 52C, passes through the main body portion 52A, to as far as the extension portion 52B. The various wiring (not illustrated in the drawings) in the main body casing 14 (see FIG. 1) is thereby connected to the display casing 12 (see FIG. 1) through the through-hole 52F and the groove 52E. Note that the shaft portion 52C is disposed inside the through-hole 14B (see FIG. 2).

As an example, cut faces 52G are formed at four locations to portions of a side face (an outside face running along the second axial line K) of the shaft portion 52C. The side face of the shaft portion 52C including the cut faces 52G is fitted together with hole walls of a fitting hole 61A (see FIG. 7) of the washer 61 (see FIG. 6), described later.

Arm Members

As illustrated in FIG. 4, each arm member 44 is formed with a groove 45 open toward the H direction upper side extending along the W direction. The groove 45 and the groove 52E of the coupling member 52 are linked together. Side walls 44A, 44B are formed protruding straight out in the H direction to an upper portion of the arm member 44. The side walls 44A, 44B are disposed facing each other with their length direction along the W direction and a spacing in the L direction therebetween. A cover member 46 (see FIG. 3) is fitted to the side walls 44A, 44B. The cover member 46 covers the grooves 45 and the groove 52E of the coupling member 52.

A circular tube shaped supporting portion 47 is provided at a W direction end portion of each arm member 44. The respective supporting portions 47 are open toward the W direction outside, and the respective shafts 41 are fitted into and fixed to the supporting portions 47. Namely, the shafts 41 project out from the W direction end portions of the respective arm members 44 toward the W direction outsides, such that the pivot sections 32 pivot about the shafts 41 as previously described.

Base

Figure 9:
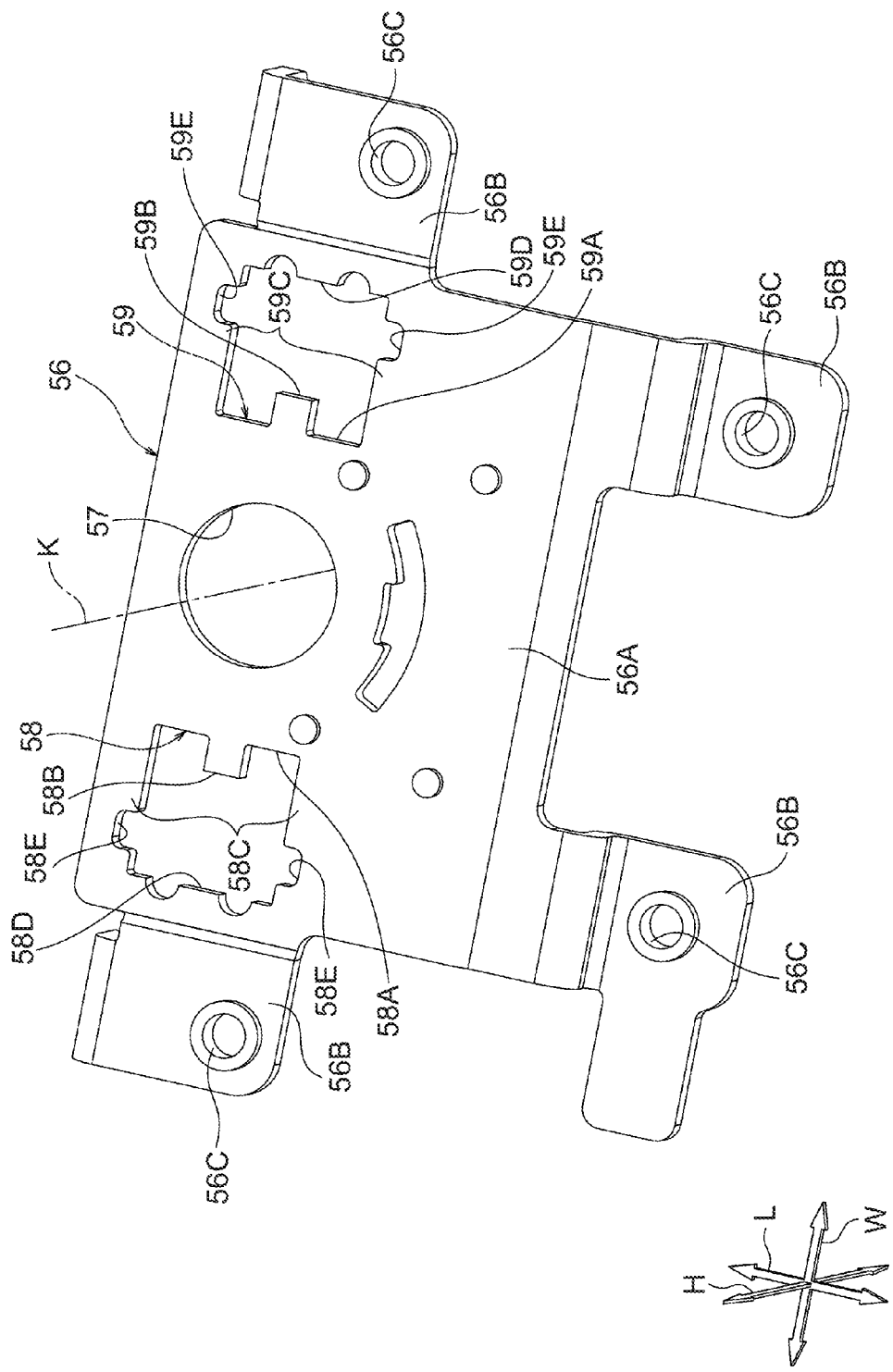
FIG. 9 is a perspective view of a base.

As illustrated in FIG. 9, as an example, the base 56 is configured of metal plate. The base 56 includes a plate shaped portion 56A with a planar face running along the W-L plane, and fastening portions 56B that are each bent in a crank shape at a peripheral edge of the plate shaped portion 56A. The circular shaped shaft hole 57 is formed piercing through in the H direction about the second axial line K at the W direction center and L direction rear side of the plate shaped portion 56A. The above-described shaft portion 52C (see FIG. 8) is inserted into the shaft hole 57. The base 56 supports the coupling member 52 (see FIG. 3), such that the coupling member 52 rotates about the second axial line K. Note that a hole 56C is formed piercing through each fastening portion 56B in the H direction.

The base 56 is formed with housing ports 58, 59 piercing through in the H direction at locations of the plate shaped portion 56A that are further toward the respective W direction outsides than the shaft hole 57. The housing port 58 and the housing port 59 have the same size and the same shape as each other, and are disposed symmetrically about the second axial line K. The size of the housing ports 58, 59 is a size that houses the respective cam members 64 (see FIG. 6).

A projection portion 58B is formed projecting out toward the outside in the radial direction of the shaft portion 52C (see FIG. 9) at an inner wall 58A, which runs along the L direction and is the part of an inner wall of the housing port 58 that is disposed at the closest position to the shaft hole 57. As an example, the projection portion 58B is a rectangular plate shaped portion projecting out from the L direction center of the inner wall 58A along the W direction. The housing port 58 also includes edge portions 58C. Parts of the edge portions 58C contact guided portions 64G of the respective cam member 64 (see FIG. 10), described later.

The respective block member 68 (see FIG. 12), described later, is fixed to a facing portion 58D, which is a part of the housing port 58 that faces the projection portion 58B. Two cutout portions 58E which face each other in the L direction are formed at the respective edge portions 58C. The width in the L direction from one cutout portion 58E to the other cutout portion 58E is larger than the overall width in the L direction of the guided portions 64G of the respective cam member 64 (see FIG. 10), described later.

A projection portion 59B is formed projecting out toward the outside in the radial direction of the shaft portion 52C (see FIG. 9) at a wall 59A, which runs along the L direction and is the part of a wall of the housing port 59 that is disposed at the closest position to the shaft hole 57. As an example, the projection portion 59B is a rectangular plate shaped portion projecting out from the L direction center of the wall 59A along the W direction. The housing port 59 also includes edge portions 59C. Parts of the edge portions 59C contact guided portions 64G of the respective cam member 64 (see FIG. 10), described later.

The respective block member 68 (see FIG. 12), described later, is fixed to a facing portion 59D, which is a part of the housing port 59 that faces the projection portion 59B. Two cutout portions 59E which face each other in the L direction are formed at the respective edge portions 59C. The width in the L direction from one cutout portion 59E to the other cutout portion 59E is larger than the overall width in the L direction of the guided portions 64G of the respective cam member 64 (see FIG. 10), described later.

Note that the base 56 is fixed inside the main body casing 14 by fastening the fastening portions 56B to an inner wall face of the main body casing 14 (see FIG. 2) using screws (not illustrated in the drawings). Namely, the base 56 is provided at the main body casing 14. As illustrated in FIG. 5, the restricting plate 69 that restricts rotation of the coupling member 52 to within a set range is provided at the H direction upper side of the base 56. Note that, as an example, the restricting plate 69 restricts the coupling member 52 from rotating to an angle larger than 180°, but does not restrict the coupling member 52 from rotating to an angle of 180° or less.

Washer

Figure 7:
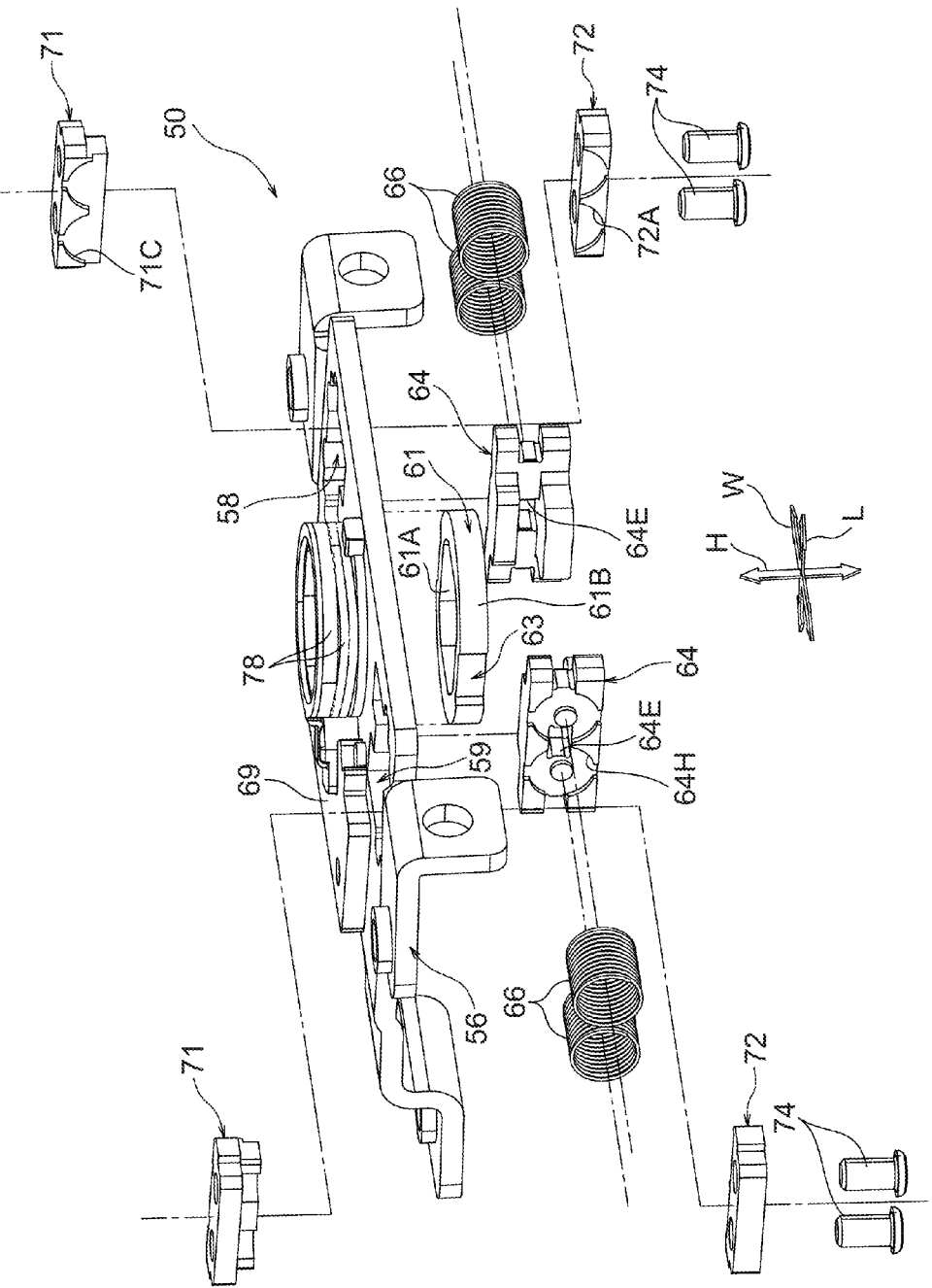
FIG. 7 is an exploded perspective view of a portion of a hinge unit.

As illustrated in FIG. 6 and FIG. 7, as an example, the washer 61 is a ring shaped member made of metal, and has an outer peripheral face 61B formed in a circular shape, excluding parts thereof. The fitting hole 61A that is fitted together with the shaft portion 52C (see FIG. 8) is formed in the washer 61. The washer 61 is provided at the shaft portion 52C by fitting the shaft portion 52C together with the fitting hole 61A, and rotates together with the shaft portion 52C.

Figure 14:
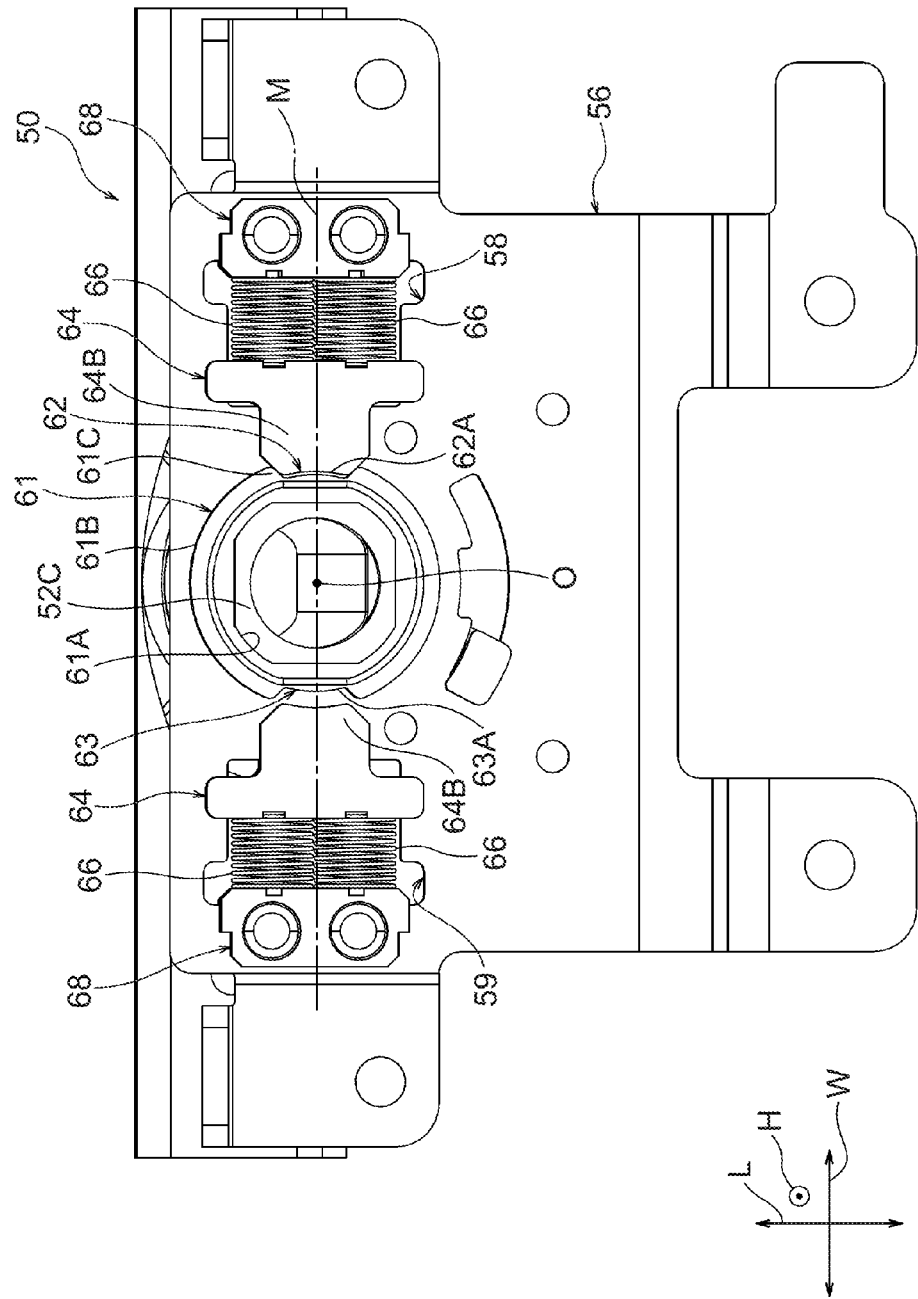
FIG. 14 is a bottom face view of a hinge unit.

As illustrated in FIG. 14, a recessed portion 62 and a recessed portion 63 are formed at an outer peripheral portion 61C of the washer 61. The recessed portion 62 and the recessed portion 63 are both open toward the outside in the radial direction of the shaft portion 52C. The recessed portion 62 and the recessed portion 63 are disposed symmetrically to each other on a straight line M passing through a rotation center O of the shaft portion 52C. Namely, the recessed portion 62 and the recessed portion 63 are disposed offset by 180° in the circumferential direction from each other. Note that being disposed symmetrically on the straight line M is a concept that includes being slightly offset from the straight line M due to dimensional tolerance or assembly error with respect to design values of each member.

The recessed portion 62 and the recessed portion 63 each include an inverted trapezoid shaped wall face viewed from the open side. A bottom face 62A of the recessed portion 62 configures a curved face in a protruding shape toward the outside (open side). A bottom face 63A of the recessed portion 63 configures a curved face in a protruding shape toward the outside (open side).

Cam Members

Figure 10:
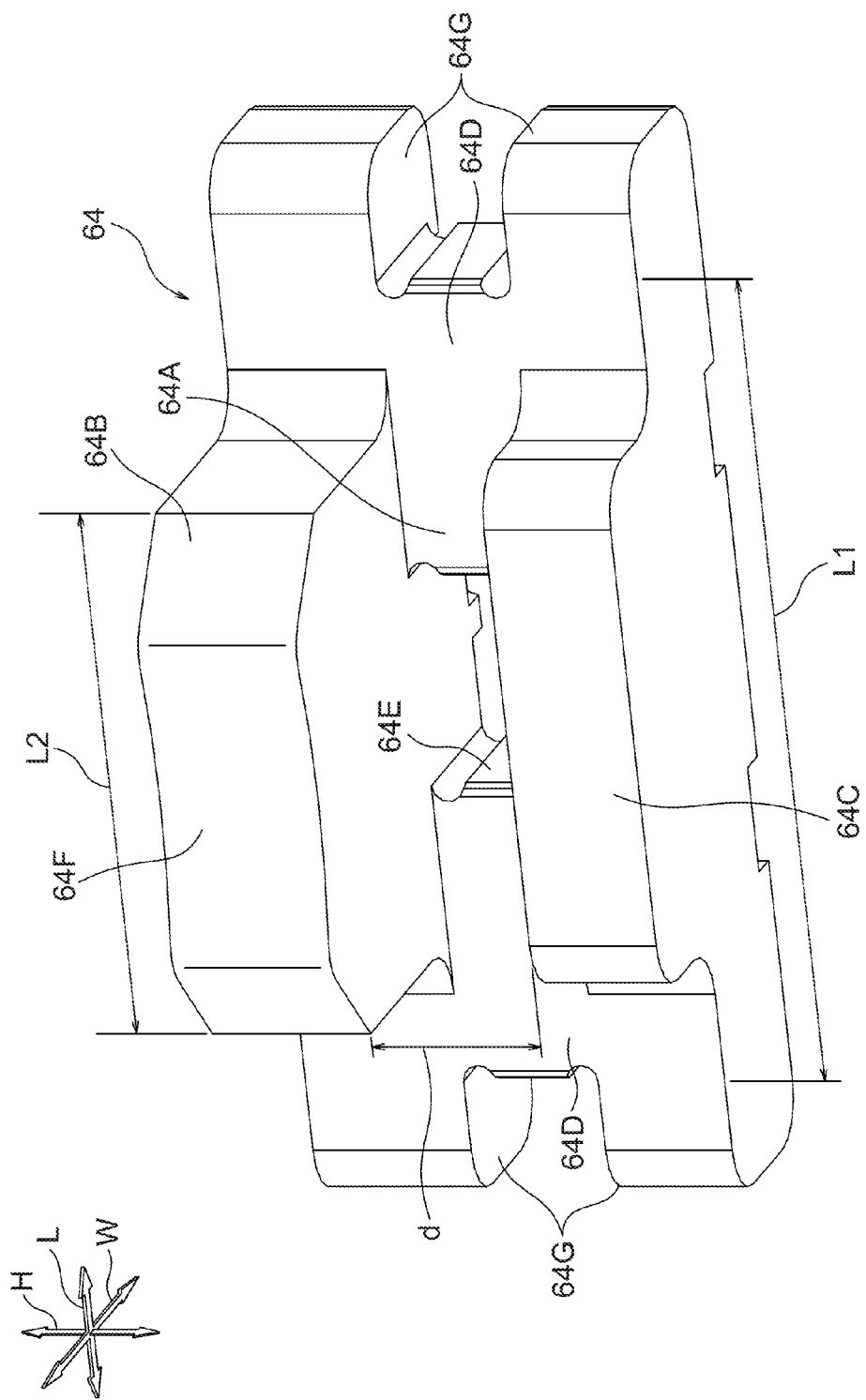
FIG. 10 is a perspective view of a cam member.

The cam member 64 illustrated in FIG. 10 is, as an example, made of metal. The cam member 64 includes a plate shaped main body portion 64A protruding straight out along the L-H plane, a protruding portion 64B that projects out from an H direction upper portion of the main body portion 64A along the W direction, and a jutting-out portion 64C that juts out from an H direction lower portion of the main body portion 64A along the W direction.

The main body portion 64A is formed with widened portions 64D, which have a wider overall width L1 along the L direction than a width L2 of the protruding portion 64B along the L direction. Note that the L direction is an example of an intersecting direction that intersects the radial direction of the shaft portion 52C (see FIG. 8). The main body portion 64A is also formed with a through-hole 64E, serving as an example of an insertion hole piercing through in the W direction.

A W direction leading end portion of the protruding portion 64B configures a trapezoidal plate shaped portion viewed in the H direction (in plan view). A leading end face 64F is formed at a W direction leading end (a location corresponding to an upper base of the trapezoidal shape) of the protruding portion 64B. The leading end face 64F configures a recess shaped curved face when the protruding portion 64B is viewed in the H direction. The leading end face 64F has a curvature such that the leading end face 64F is in face-to-face contact with the bottom face 62A of the recessed portion 62 (see FIG. 14).

The jutting-out portion 64C is a plate shaped portion that juts out from the main body portion 64A in the same direction as the protruding portion 64B. The jutting-out portion 64C is positioned at the H direction lower side of the protruding portion 64B, and a space of a distance d is formed between an upper face of the jutting-out portion 64C and a lower face of the protruding portion 64B. The distance d is larger than the plate thickness of the base 56 (see FIG. 9). Namely, the protruding portion 64B is disposed at the upper side of the base 56, and the jutting-out portion 64C is disposed at the lower side of the base 56. Note that, as an example, the W direction length of the jutting-out portion 64C is shorter than the W direction length of the protruding portion 64B.

The widened portions 64D widen at either L direction side of the main body portion 64A. The guided portions 64G are formed projecting out toward either L direction side at respective L direction end portions of the widened portions 64D. As an example, the guided portions 64G are formed in two locations at the H direction upper side (one side), and two locations at the H direction lower side (the other side) of the base 56 (see FIG. 9), the H direction being the plate thickness direction of the base 56, with a spacing therebetween, and are formed in four locations in total. The guided portions 64G are accordingly disposed at the front side and back side of the base 56 (see FIG. 9), and contact, and are guided in the W direction by, the edge portions 58C, 59C (see FIG. 9) of the respective housing ports 58, 59 (see FIG. 9).

The through-hole 64E is positioned at a center portion of the main body portion 64A between the protruding portion 64B and the jutting-out portion 64C when the cam member 64 is viewed in the W direction. The through-hole 64E has a size that can be inserted into the respective projection portions 58B, 59B of the base 56 (see FIG. 9).

Figure 11:
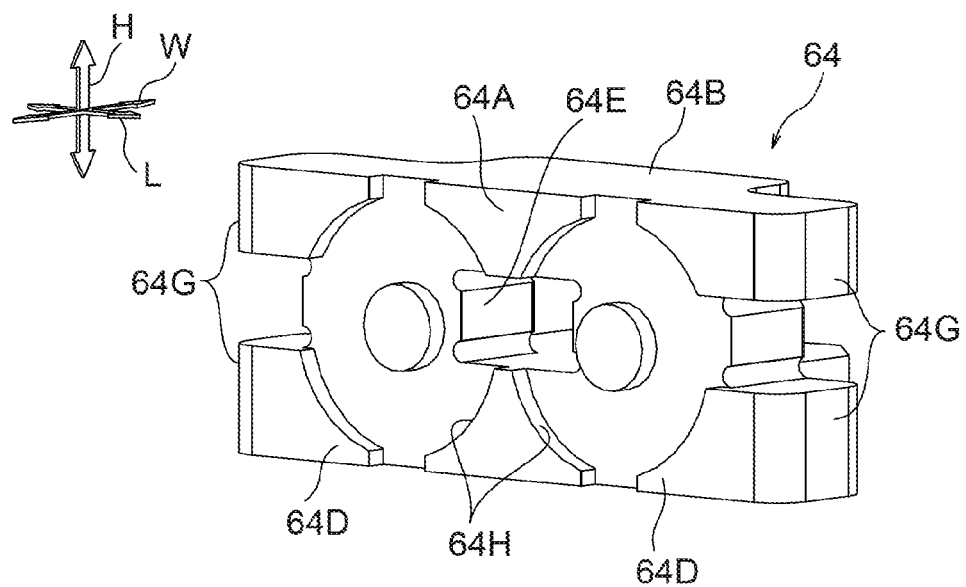
FIG. 11 is a perspective view of a cam member.

As illustrated in FIG. 11, two indented portions 64H are formed side-by-side in the L direction to a side face of the main body portion 64A and the widened portions 64D at the opposite side to the protruding portion 64B. The two indented portions 64H are each formed in a ring shape viewed in the W direction, and contact one W direction ends of two of the springs 66 (see FIG. 6), described later.

Note that the cam members 64 are inserted into the housing ports 58, 59 illustrated in FIG. 9, and accordingly move in the W direction (radial direction) at the outside of the shaft hole 57 (shaft portion 52C (see FIG. 6)).

Springs

As illustrated in FIG. 5, of the four springs 66, two springs 66 are housed side-by-side in the L direction inside the housing port 58, and two springs 66 are housed side-by-side in the L direction inside the housing port 59, with their biasing direction along the W direction. As an example, the four springs 66 are exposed to the H direction front side (upper side) and back side (lower side) of the base 56. As illustrated in FIG. 14, the one W direction ends of the four (two sets of) springs 66 abut the respective indented portions 64H of the cam members 64 (see FIG. 11), such that the two cam members 64 are biased toward the rotation center O of the shaft portion 52C.

Note that in the hinge unit 50, one cam member 64 and two springs 66 configure one set, and two sets (pairs) of cam members 64 and springs 66 are disposed symmetrically to each other on the straight line M passing through the rotation center O of the shaft portion 52C.

Block Members

Figure 12:
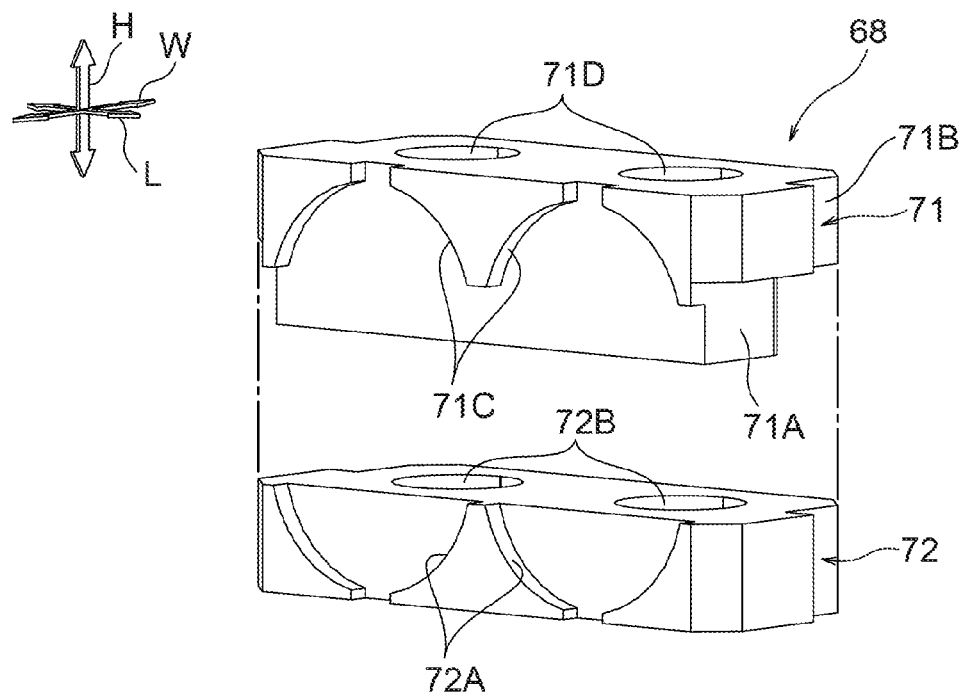
FIG. 12 is an exploded perspective view of a block member.

As illustrated in FIG. 12, each block member 68 is divided into a first retaining member 71 disposed at the front side (one side), and a second retaining member 72 disposed at the back side (the other side), in the plate thickness direction (H direction) of the base 56 (see FIG. 9).

The first retaining member 71 includes a plate shaped straight protruding portion 71A protruding straight out along the H direction, and a plate shaped extension portion 71B extending along the W direction from an upper portion of the straight protruding portion 71A. Indented portions 71C that are indented in the W direction are formed at a side face of the straight protruding portion 71A at the opposite side to the extension portion 71B. Each indented portion 71C has a semicircular shape with a protrusion at the top viewed in the W direction. Two indented portions 71C are formed side-by-side in the L direction. The extension portion 71B is formed with two fastening holes 71D piercing through in the H direction with a spacing in the L direction therebetween.

The second retaining member 72 is formed in a plate shape that widens along the W-L plane. The second retaining member 72 is formed with indented portions 72A indented in the W direction in one side face thereof. Each indented portion 72A has a semicircular shape with a protrusion at the bottom viewed in the W direction. Two of the indented portions 71C are formed side-by-side in the L direction. The second retaining member 72 is formed with two through-holes holes 72B piercing through in the H direction with a spacing in the L direction therebetween.

Explanation follows regarding operation of the present exemplary embodiment.

Hinge Unit Assembly

The shaft portion 52C of the coupling member 52 illustrated in FIG. 8 is inserted into the shaft hole 57 of the base 56 (see FIG. 9), in a state in which the shaft portion 52C has been inserted into plural washers 78 (see FIG. 7). The coupling member 52 is accordingly disposed at the front side of the base 56, and an end portion of the shaft portion 52C projects out at the back side of the base 56. Then, in a case in which the shaft portion 52C is fitted together with the fitting hole 61A of the washer 61 as illustrated in FIG. 13, the coupling member 52 is rotatably supported by the base 56.

Next, the cam members 64 (see FIG. 10) are respectively inserted into the housing ports 58, 59 illustrated in FIG. 9. The guided portions 64G of the cam members 64 (see FIG. 10) are accordingly guided by the edge portions 58C, 59C. In a case in which this is performed, as illustrated in FIG. 13, the two cam members 64 are disposed symmetrically to each other in the W direction, with their respective protruding portions 64B facing toward the washer 61.

Figure 13:
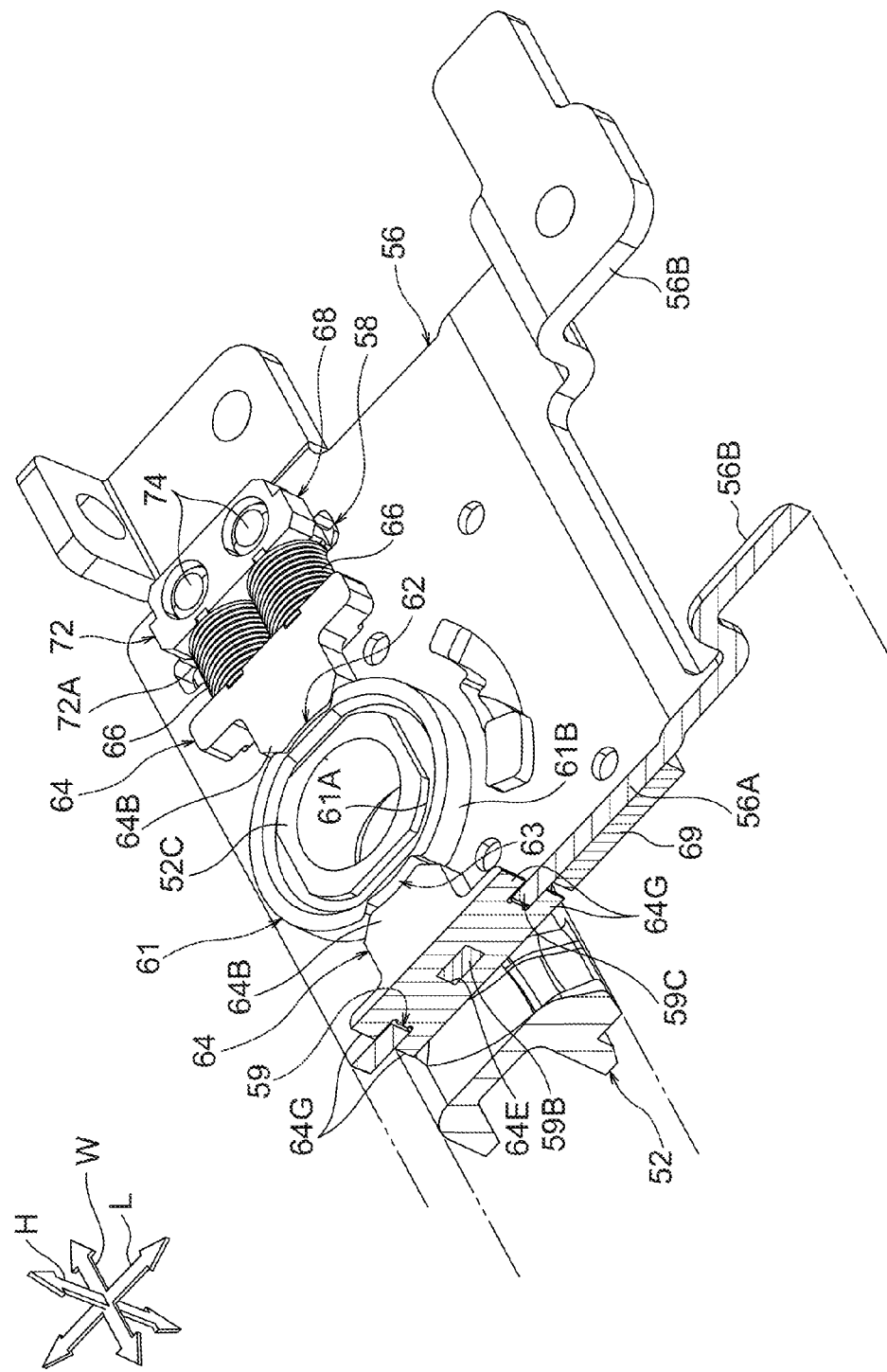
FIG. 13 is an enlarged perspective view of part of a hinge unit.

Next, as illustrated in FIG. 13, the projection portion 58B of the housing port 58 (see FIG. 9) is inserted into the through-hole 64E of one cam member 64 (see FIG. 10). The projection portion 59B of the housing port 59 is inserted into the through-hole 64E of the other cam member 64. The protruding portions 64B of the two cam members 64 are accordingly in contact with the outer peripheral face 61B of the washer 61. Note that, although in FIGS. 6, 13, and 14, the protruding portion 64B and the recessed portion 63 are separated from each other in order to clearly illustrate the shape of the recessed portion 63, the protruding portion 64B and the recessed portion 63 contact each other in reality.

Next, in the housing ports 58, 59, the block members 68 are provided at the facing portions 58D, 59D of the housing ports 58, 59 (see FIG. 9), in a state in which the one ends of the two springs 66 are in contact with the indented portions 64H of the respective cam member 64 (see FIG. 11).

Specifically, as illustrated in FIG. 12, in each of the facing portions 58D, 59D (see FIG. 9), the first retaining member 71 is superimposed on the second retaining member 72 with the plate shaped portion 56A sandwiched therebetween, and a single circle is formed by each indented portion 71C and indented portion 72A. The fastening holes 71D and the respective through-holes 72B are then aligned in the H direction. Screws 74 (see FIG. 7) are inserted into the through-holes 72B and fastened to the fastening holes 71D in this state, such that the first retaining members 71 and the second retaining members 72 are fixed to the facing portions 58D, 59D to form the block members 68.

Next, as illustrated in FIG. 13, the other ends of the two springs 66 are retained by the respective block member 68 in the biasing direction (W direction) due to the indented portions 71C (see FIG. 12) and the indented portions 72A being in contact with each other.

Note that, in the case of a comparative example in which the first retaining member 71 and the second retaining member 72 (see FIG. 12) are integrally formed, the block members 68 cannot be inserted into the respective housing ports 58, 59 unless the two springs 66 are compressed to shorten their length. This is because each block member 68 has a C-shaped W-H plane cross-section, and the block members 68 cannot be inserted into the housing ports 58, 59 unless the springs 66 are compressed in excess the amount of the W direction length of the extension portions 71B. However, since the two springs 66 have a large biasing force, it is a difficult operation to compress the two springs 66 and to insert the block members 68 into the housing ports 58, 59 in the configuration of the comparative example.

However, in the present exemplary embodiment, as illustrated in FIG. 12, each block member 68 is divided into the first retaining member 71 and the second retaining member 72. Thus, in the present exemplary embodiment, it is sufficient that the springs 66 (see FIG. 7) are compressed by the amount of the W direction thickness of the straight protruding portion 71A in a case in which the first retaining member 71 and the second retaining member 72 are being attached to the base 56 (see FIG. 9). Namely, in the present exemplary embodiment, the force required to compress the springs 66 is less than in the comparative example, thereby facilitating the attachment operation of the block members 68 to the base 56.

Hinge Unit Operation

Figure 15:
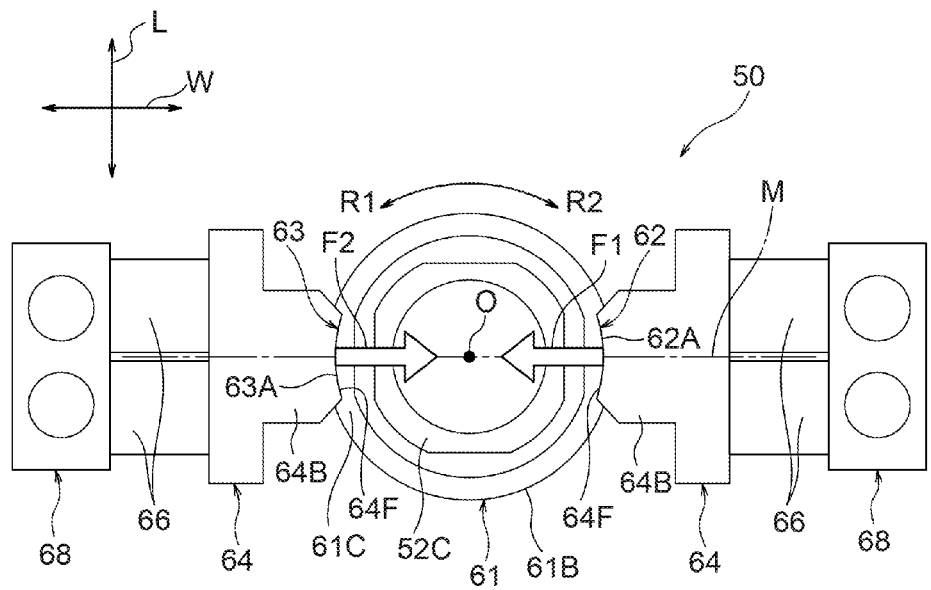
FIG. 15 schematically illustrates a contact state between protruding portions and recessed portions in a hinge unit.

As illustrated in FIG. 15, in the open state of the personal computer 10 illustrated in FIG. 1, the protruding portions 64B of the two cam members 64 biased by the springs 66 are in contact (engage) with the recessed portions 62, 63 of the washer 61. When this occurs, pressing forces F1, F2 toward the rotation center O act on the recessed portions 62, 63. The pressing force F1 and the pressing force F2 are both on the straight line M passing through the rotation center O, and have the same magnitude in opposite directions. Rotation of the shaft portion 52C is thereby suppressed, and the orientation of the display casing 12 is retained as illustrated in FIG. 1.

Figure 16:
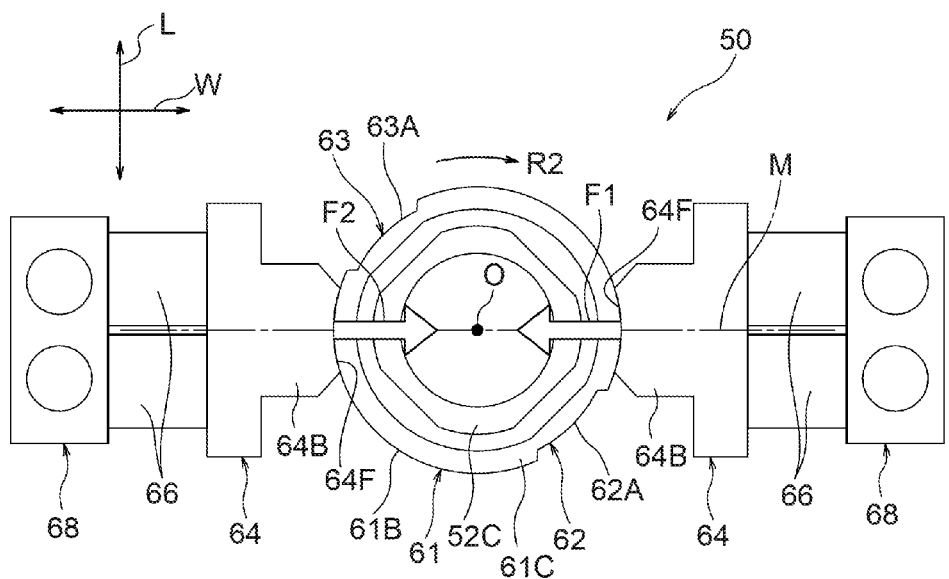
FIG. 16 schematically illustrates a contact state between protruding portions and a rotation shaft when the rotation shaft is rotating.

Then, as an example, when the display casing 12 is rotated in the arrow R2 direction in the open state of the personal computer 10, as illustrated in FIG. 16, the protruding portions 64B of the two cam members 64 separate from the recessed portions 62, 63, and contact the outer peripheral face 61B of the washer 61. When this is performed, the pressing forces F1, F2 toward the rotation center O act on the outer peripheral face 61B. Since the pressing force F1 and the pressing force F2 are on the straight line M passing through the rotation center O as previously described, the pressing directions do no change.

Next, in a case in which the rotation angle of the display casing 12 (see FIG. 1) reaches 180°, the protruding portions 64B of the two cam members 64 make contact (engage) with the recessed portions 62, 63. When this occurs, as illustrated in FIG. 15, the pressing forces F1, F2 toward the rotation center O act on the recessed portions 62, 63. Rotation of the shaft portion 52C is thereby suppressed, and the display casing 12 retains its orientation.

Thus, in the personal computer 10 (see FIG. 1), in a case in which the display casing 12 has been rotated about the second axial line K in this manner, the pressing forces F1, F2 act toward the rotation center O, thereby enabling a change in the direction of the forces acting on the shaft portion 52C to be suppressed.

In the personal computer 10, an indexing sensation (clicking sensation) can be felt by the hand holding the display casing 12 when the display casing 12 is rotated and the protruding portions 64B enter into and make contact (engage) with the recessed portions 62, 63. Note that in the hinge unit 50, a change in the direction of the forces acting on the shaft portion 52C is suppressed, such that the obtained indexing sensation is not liable to change as long as the shapes of the protruding portions 64B and the recessed portions 62, 63 are set. Thus in the hinge unit 50, the indexing sensation is easily adjusted by changing the shapes of the protruding portions 64B and the recessed portions 62, 63, compared to a configuration in which the directions of forces acting on the shaft portion 52C change.

In the personal computer 10, as illustrated in FIG. 15, the recessed portions 62, 63, the two cam members 64, and the four springs 66 are disposed symmetrically to each other on the straight line M passing through the rotation center O. Thus, in a case in which the display casing 12 (see FIG. 1) has been rotated by 180° from the state in which the recessed portions 62, 63 and the protruding portions 64B were in contact with each other, the recessed portions 62, 63 and the protruding portions 64B engage with each other again. This enables the display casing 12 to be restricted from rotating, both in a placement state in which the back face 12A of the display casing 12 (see FIG. 1) is in a face-on view, and in a placement state in which the front face 12B (see FIG. 1) is in a face-on view.

In addition thereto, in the personal computer 10, the recessed portions 62, 63, the two cam members 64, and the four springs 66 are disposed in a straight line shape, such that the respective members do not need to be disposed in a direction intersecting the straight line M. This enables the hinge unit 50 to be smaller in size than a configuration in which the respective members are not disposed in a straight line shape.

In the personal computer 10, the recessed portions 62, 63 are formed at the outer peripheral portion 61C of the washer 61 that is fitted together with the shaft portion 52C, thereby enabling the shape and depth of the recessed portions 62, 63 to be freely set, regardless of the size of the shaft portion 52C. This enables the diameter of the shaft portion 52C in the personal computer 10 to be reduced. This also enables the radial direction thickness of the shaft portion 52C in the personal computer 10 to be made thinner.

In addition thereto, in the personal computer 10, the bottom faces 62A, 63A of the recessed portions 62, 63 each configure a protrusion shaped curved face, and the leading end faces 64F of the protruding portions 64B each configure a recess shaped curved face, thereby enabling the contact surface area to be increased compared to a configuration in which the bottom faces 62A, 63A and the leading end faces 64F have planar faces. Since the leading end faces 64F each have a recess shaped curved face, the contact surface area between the cam members 64 and the outer peripheral face 61B of the washer 61 is also increased. The hinge unit 50 thereby enables vigorous rotation of the shaft portion 52C to be suppressed.

In the personal computer 10, as illustrated in FIG. 10, the widened portions 64D are formed at the cam members 64. This enables the cam members 64 to bear the biasing force of the springs 66, even in cases in which the diameter, or the number, of the springs 66 (see FIG. 7) has been increased.

In the personal computer 10, as illustrated in FIG. 15, two springs 66 are employed in one cam member 64. This enables the springs 66 to be smaller in diameter than in cases in which one, large diameter spring 66 is employed, thereby enabling the hinge unit 50 to have a thinner H direction thickness and to be made smaller in size. In addition thereto, in cases in which one spring 66 is employed, there is a concern that due to variation in manufacture, the biasing force of the springs 66 would differ greatly in each hinge unit 50; however, in the present exemplary embodiment, two springs 66 are employed, thereby enabling the variation in biasing force to be reduced.

In the personal computer 10, as illustrated in FIGS. 9, 10, and 13, the cam members 64 are guided in the W direction by the projection portions 58B, 59B formed at the housing ports 58, 59 of the base 56. This enables the movement direction of the cam members 64 to be more stable than in a configuration in which the projection portions 58B, 59B are not provided.

In the personal computer 10, the guided portions 64G of each cam member 64 are formed in two locations (four locations in total) with a spacing in the H direction therebetween. The guided portions 64G are in contact with the front side and back side of the edge portions 58C, 59C, and are guided in the W direction (one example of the radial direction). Thus, not only is the movement direction of the cam members 64 stabilized in the personal computer 10, but the cam members 64 can also be suppressed from coming away from the housing ports 58, 59.

In the personal computer 10, as illustrated in FIGS. 7 and 9, the block members 68 are provided at the edge portions 58C, 59C, and the block members 68 retain the other ends of the springs 66. This enables the other ends of the springs 66 to be retained, even if the base 56 is configured of a thin metal plate.

In the personal computer 10, as illustrated in FIG. 1, the display casing 12 including the display panel 20 is coupled to the main body casing 14 through the hinge unit 50 (see FIG. 5). This enables the same indexing sensation to be obtained in both the arrow R1 direction and the arrow R2 direction when the display casing 12 has been rotated 180° about the second axial line K.

Explanation follows regarding modified examples of the present exemplary embodiment.

In the above exemplary embodiment, a notebook personal computer has been described as an example of an electronic device; however, another electronic device, such as a cellphone in which a main body casing and a display casing are superimposed on each other, may be employed.

The coupling member 52 may be configured only including the shaft portion 52C. The recessed portions 62, 63 may be formed at the shaft portion 52C without employing the washer 61. Of the two protruding portions 64B and the recessed portions 62, 63, a single set of either may be employed. The recessed portions 62, 63 may be configured offset from the straight line M passing through the rotation center O.

The base 56 may be formed without housing ports 58, 59. In such cases, the cam members 64, the springs 66, and the block members 68 may be disposed at the front side or the back side of the base 56.

The cam members 64 may be formed without the widened portions 64D. The cam members 64 may also be formed without the through-holes 64E and the guided portions 64G. In such cases, the cam members 64 may be guided in the W direction by a rail member provided at the base 56. The leading end of each protruding portion 64B may be a planar face, as long as the required contact surface area is secured.

There may be one, or three or more, springs 66 provided for one cam member 64. An elastic member such as a plate spring may be employed instead of the springs 66, as long as the required biasing force can be obtained.

In the hinge unit 50, the edge portions 58C, 59C of the housing ports 58, 59 may be bent to retain the other ends of the springs 66 without providing the block members 68. Each block member 68 may be provided as an integral unit without being divided into the first retaining member 71 and the second retaining member 72, as long as there are no issues with ease of operation.

Note that any of the modified examples out of the plural modified examples above that can be combined may be combined as appropriate.

An exemplary embodiment of the present disclosure has been explained above; however, the present disclosure is not limited to the above explanation, and obviously various other modifications may be implemented within a range not departing from the spirit thereof.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An electronic device comprising:
a coupling member that is provided at a first casing and that is formed with a rotation shaft;
a supporting member that is provided at a second casing and that is formed with a shaft hole into which the rotation shaft is inserted;
a rotation section that is provided at the rotation shaft and that is formed with a recessed portion open toward a radial direction outside of the rotation shaft;
a moving member that includes a protruding portion to engage with the recessed portion, and that moves in the radial direction at the radial direction outside of the rotation shaft; and
a biasing member that biases the moving member toward a rotation center of the rotation shaft, wherein
the rotation section is a ring-shaped member that is fitted together with the rotation shaft and rotates together with the rotation shaft,
the recessed portion is formed at an outer peripheral portion of the ring-shaped member,
an outer peripheral face of the ring-shaped member has a circular shape,
a bottom face of the recessed portion formed at the outer peripheral face has a protrusion-shaped curved face, and
a leading end face of the protruding portion that contacts the bottom face has a recess-shaped curved face.

2. The electronic device of claim 1, wherein:
in the rotation section, a pair of the recessed portions are disposed symmetrically to each other on a straight line passing through the rotation center; and
a first moving member-biasing member set and a second moving member-biasing member set are disposed symmetrically to each other on the straight line.

3. The electronic device of claim 1, wherein:
the supporting member is formed in a plate shape with an axial direction of the rotation shaft as a plate thickness direction;
a housing port that houses the moving member is formed in the supporting member at the radial direction outside of the shaft hole;
a projection portion that projects out in the radial direction is formed at a portion of an inner wall of the housing port; and
an insertion hole into which the projection portion is inserted is formed in the moving member.

4. The electronic device of claim 3, wherein a guided portion that contacts the inner wall of the housing portion and that is guided in the radial direction is formed at the moving member.

5. The electronic device of claim 4, wherein the guided portion is provided at one side and at another side in the plate thickness direction of the supporting member.

6. The electronic device of claim 3, wherein:
a retaining member that retains the biasing member in the biasing direction of the biasing member is provided at the inner wall of the housing port of the supporting member.

7. The electronic device of claim 6, wherein:
the retaining member is divided into a first retaining member that is disposed at one side in the plate thickness direction of the supporting member, and a second retaining member that is disposed at another side in the plate thickness direction of the supporting member.

8. The electronic device of claim 1, wherein:
the electronic device is a notebook personal computer;
a display section that displays information is provided at the first casing; and
an input section with which input is performed is provided at the second casing.

9. An electronic device comprising:
a coupling member that is provided at a first casing and that is formed with a rotation shaft;
a supporting member that is provided at a second casing and that is formed with a shaft hole into which the rotation shaft is inserted;
a rotation section that is provided at the rotation shaft and that is formed with a recessed portion open toward a radial direction outside of the rotation shaft;
a moving member that includes a protruding portion to engage with the recessed portion, and that moves in the radial direction at the radial direction outside of the rotation shaft; and
a biasing member that biases the moving member toward a rotation center of the rotation shaft, wherein
a widened portion, that has a wider width than a width of the protruding portion in a direction intersecting the radial direction, is formed at the moving member.

10. The electronic device of claim 9, wherein the biasing member is a plurality of spring members, in which one end of the biasing member abuts the widened portion.

11. A hinge unit comprising:
a coupling member that is formed with a rotation shaft;
a supporting member that is formed with a shaft hole into which the rotation shaft is inserted;
a rotation section that is provided at the rotation shaft and that is formed with a recessed portion open toward a radial direction outside of the rotation shaft;
a moving member that includes a protruding portion to engage with the recessed portion, and that moves in the radial direction at the radial direction outside of the rotation shaft; and
a biasing member that biases the moving member toward a rotation center of the rotation shaft, wherein
the rotation section is a ring-shaped member that is fitted together with the rotation shaft and rotates together with the rotation shaft,
the recessed portion is formed at an outer peripheral portion of the ring-shaped member,
an outer peripheral face of the ring-shaped member has a circular shape,
a bottom face of the recessed portion formed at the outer peripheral face has a protrusion-shaped curved face, and
a leading end face of the protruding portion that contacts the bottom face has a recess-shaped curved face.

12. The hinge unit of claim 11, wherein:
in the rotation section, a pair of the recessed portions are disposed symmetrically to each other on a straight line passing through the rotation center; and
a first moving member-biasing member set and a second moving member-biasing member set are disposed symmetrically to each other on the straight line.

13. The hinge unit of claim 11, wherein:
the supporting member is formed in a plate shape with an axial direction of the rotation shaft as a plate thickness direction;

a housing port that houses the moving member is formed in the supporting member at the radial direction outside of the shaft hole;

a projection portion that projects out in the radial direction is formed at a portion of an inner wall of the housing port; and an insertion hole into which the projection portion is inserted is formed in the moving member.

14. The hinge unit of claim 13, wherein a guided portion that contacts the inner wall of the housing portion and that is guided in the radial direction is formed at the moving member.

15. The hinge unit of claim 13, wherein:

a retaining member that retains the biasing member in the biasing direction of the biasing member is provided at the inner wall of the housing port of the supporting member.

16. A hinge unit comprising:

a coupling member that is formed with a rotation shaft;

a supporting member that is formed with a shaft hole into which the rotation shaft is inserted;

a rotation section that is provided at the rotation shaft and that is formed with a recessed portion open toward a radial direction outside of the rotation shaft;

a moving member that includes a protruding portion to engage with the recessed portion, and that moves in the radial direction at the radial direction outside of the rotation shaft; and a biasing member that biases the moving member toward a rotation center of the rotation shaft, wherein a widened portion, that has a wider width than a width of the protruding portion in a direction intersecting the radial direction, is formed at the moving member.

* * * * *